United States Patent
Khojastepour et al.

(10) Patent No.: US 8,275,322 B2
(45) Date of Patent: Sep. 25, 2012

(54) RATELESS CODING FOR MULTIUSER INTERFERENCE RELAY CHANNEL

(75) Inventors: Mohammad A. Khojastepour, North Brunswick, NJ (US); Xiaodong Wang, New York, NY (US)

(73) Assignee: NEC Laboratories America, Inc., Princeton, NJ (US)

(*) Notice: Subject to any disclaimer, the term of this patent is extended or adjusted under 35 U.S.C. 154(b) by 263 days.

(21) Appl. No.: 12/432,232

(22) Filed: Apr. 29, 2009

(65) Prior Publication Data

US 2009/0270028 A1    Oct. 29, 2009

Related U.S. Application Data

(60) Provisional application No. 61/048,598, filed on Apr. 29, 2008.

(51) Int. Cl.
   *H04B 1/00*    (2006.01)

(52) U.S. Cl. ........... 455/63.1; 370/317; 370/315; 455/7; 455/8; 455/10

(58) Field of Classification Search .................. 370/317, 370/315; 455/7, 8, 10
   See application file for complete search history.

(56) References Cited

U.S. PATENT DOCUMENTS

2008/0163341 A1* 7/2008 Adams et al. ............... 726/4

* cited by examiner

*Primary Examiner* — Lincoln Donovan
*Assistant Examiner* — Shikha Goyal
(74) *Attorney, Agent, or Firm* — Joseph Kolodka

(57) ABSTRACT

An interference relay channel (IRC) utilizes a single relay to assist communications between multiple source-destination links under the half-duplex (HD) constraint. It is assumed that each source has an independent message and its transmitted signal may cause interference at the other destinations. It is also assumed that each node only estimates its backward channels and has no knowledge of its forward channels as well as the other links. The role of the relay is to generate signals to cooperate with the intended signal and mitigate the interference at all destinations.

23 Claims, 6 Drawing Sheets

RATELESS CODING FOR MULTIUSER INTERFERENCE RELAY CHANNEL

This application claims the benefit of U.S. Provisional Application No. 61/048,598 filed on Apr. 29, 2008, which is incorporated herein by reference.

BACKGROUND OF THE INVENTION

The present invention relates generally to interference relay channels and more particularly to improving rateless coding for multiuser interference relay channels.

In many wireless communication systems, when multiple source-destination pairs communicate, the transmission from the sources causes interference on the received signal in the other destinations when the communicating nodes are in the hearing vicinity of each other. Such a multi-user communication scenario is called interference channel (IC). Generally, it is desirable to achieve the best possible transmission rates for all the active pairs.

The channel between a pair of nodes can usually be estimated at the associated receiver. However, in most practical system setups, it is not possible to assume such channel knowledge in any other communication node especially the transmitting nodes. Thus, achieving the best possible transmission rates is difficult with knowledge of the channel state information at the receiver (CSIR) only and without any channel state information at the transmitters (CSIT).

Prior solutions have been inadequate for addressing this situation. Such inadequate solutions include using time division, frequency division, or code division multiple access schemes in order to orthogonalize the transmission from different users. However, joint transmissions from multiple sources usually achieve higher rates and overall throughput by using more sophisticated communication strategies. Such a scheme has also been considered for an interference channel. Generally, these approaches seek to mitigate the interference caused by other sources at each destination node and try to find the intended signal for this destination after some denoising or interference cancellation.

Dealing with interference is one of the main challenges of the multiuser communications in wireless environment. Practical wireless systems with multiple users are often called 'interference limited' due to the severe impact of the interference caused by the other users. Traditionally, anorthogonal transmission scheme in time, frequency, or code domain have been used to mitigate the interference. The broadcast nature of the wireless medium allows the intermediate communication nodes to hear the transmission and possibly generate a helper signal. Prior approaches in collaborative communication generally focus on the cooperation between the source node and the relay nodes in a single unicast problem. Nonetheless, the function of such relay nodes may be extended to mitigate the interference where multiple source-destination links communicate simultaneously.

The interference relay channel (IRC) has been examined where a single relay assists the communications between two interfering source-destination links. The role of the relay is then to generate signals not only to cooperate with the useful signal from the sources, but also to mitigate the interference at all destinations. One example of IRC is the shared relay channel (SRC) in which the interference from the other user is negligible and can be ignored. Thus, the role of the relay is only to generate the collaborative signal. The SRC has been analyzed from the perspective of broadcasting relay for orthogonal multiuser channels. The same channel model with multicast transmission has also been analyzed from the perspective of network coding by using the amplify-and-forward strategy. Capacity bounds for the fading and Gaussian multiple input multiple output (MIMO) SRC have been derived.

Although most of the prior work assumes static channels or perfect channel state information at the transmitters (CSIT), at least some efforts have addressed the scenario in which the channel for each link is only estimated at the corresponding receiver and is unknown to all other nodes. Since acquiring CSIT is especially hard in a network, the practical schemes that do not require CSIT (e.g., the practical rateless coding for the HD relay channel) are usually appealing. The rateless coding for single point-to-point channel has been studied for erasure channel, for the Gaussian channel, and as a general variable rate coding. The extension of the rateless codes in multiple access channels has also been considered. However, these solutions are inadequate Accordingly, improved systems and methods for improving throughput in adaptive IR hybrid ARQ wireless transmission systems are required.

BRIEF SUMMARY OF THE INVENTION

The present invention generally provides a method of packet transmission. The present invention is generally related to the use of an intermediate node (e.g., a relay node) to forward a helper signal to cooperate with all active source nodes and to mitigate interference at all active destination nodes based on the signal that the relay node has received from the transmitting sources in the past. While discussed herein generally as a single relay node, one of skill in the art would understand that multiple relay nodes may be used as appropriate. The helper signal jointly helps all active source-destination pairs. Rateless coding uses source nodes that transmit a code which is rateless and a relay node that performs variable rate decoding. The relay node decodes the messages from any source as soon as it has received enough information form a specific source. Analog relaying may also be used, where the transmitted signal from the relay node is a function (e.g., a linear function) of prior received signals at the relay node. An amplify and forward scheme is used wherein a relaying signal is a scaled version of an immediate previous received signal at each step.

An interference relay channel (IRC) utilizes a single relay to assist communications between multiple source-destination links under the half-duplex (HD) constraint. It is assumed that each source has an independent message and its transmitted signal may cause interference at the other destinations. It is also assumed that each node only estimates its backward channels and has no knowledge of its forward channels as well as the other links. The role of the relay is to generate signals to cooperate with the intended signal and mitigate the interference at all destinations. To that end, described below are coding schemes and transmission strategies for two-user AWGN IRC with two source-destination pairs.

These and other advantages of the invention will be apparent to those of ordinary skill in the art by reference to the following detailed description and the accompanying drawings.

DETAILED DESCRIPTION

The present invention is generally related to the use of an intermediate node (e.g., a relay node) to forward a helper signal to cooperate with all active source nodes and to mitigate interference at all active destination nodes based on the signal that the relay node has received from the transmitting sources in the past. While discussed herein generally as a single relay node, one of skill in the art would understand that multiple relay nodes may be used as appropriate. The helper signal jointly helps all active source-destination pairs. Rateless coding uses source nodes that transmit a code which is rateless and a relay node that performs variable rate decoding. The relay node decodes the messages from any source as soon as it has received enough information form a specific source. Analog relaying may also be used, where the transmitted signal from the relay node is a function (e.g., a linear function) of prior received signals at the relay node. An amplify and forward scheme is used wherein a relaying signal is a scaled version of an immediate previous received signal at each step.

An interference relay channel (IRC) utilizes a single relay to assist communications between multiple source-destination links under the half-duplex (HD) constraint. It is assumed that each source has an independent message and its transmitted signal may cause interference at the other destinations. It is also assumed that each node only estimates its backward channels and has no knowledge of its forward channels as well as the other links. The role of the relay is to generate signals to cooperate with the intended signal and mitigate the interference at all destinations. To that end, described below are coding schemes and transmission strategies for two-user AWGN IRC with two source-destination pairs. Two different scenarios are considered.

In the first scenario, packets have to be decoded in certain time else they will be dropped if the transmission is in outage. In the second scenario, the system has scheduling freedom and the packets transmitted from the sources may be routed though the relay in different order and time.

Figure 1:
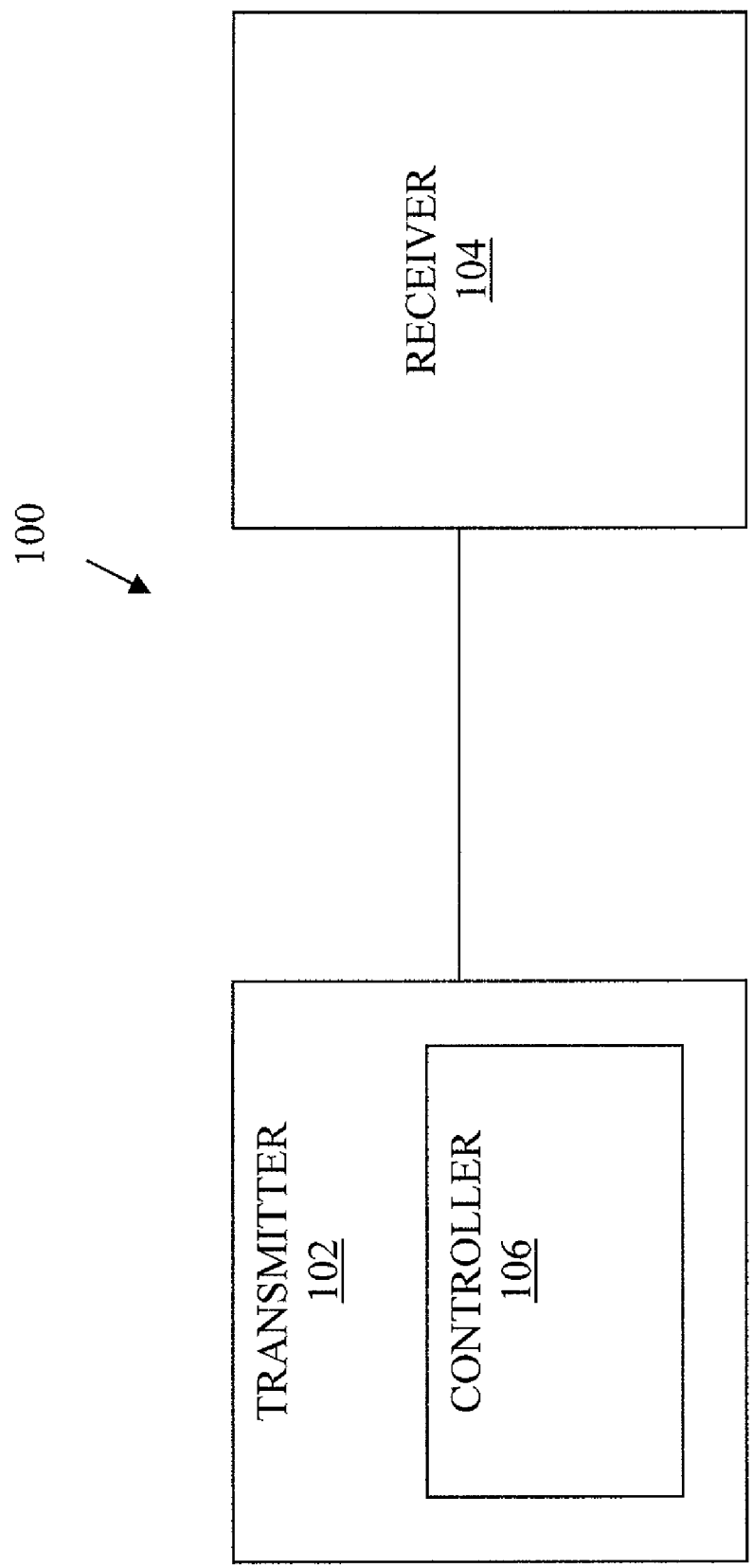
FIG. 1 depicts an IRC transmission system according to an embodiment of the present invention.

FIG. 1 depicts an IRC system 100 according to an embodiment of the present invention. The system 100 comprises multiple source nodes 102 and 104—described respectively as $S_1$ and $S_2$. Source nodes 102 and 104 communicate with corresponding destination nodes 106 and 108—described respectively as $D_1$ and $D_2$. A shared relay node 110 facilitates communications between source nodes 102, 104 and destination nodes 106, 108.

Source nodes 102, 104 may be adapted to transmit signals (e.g., wireless communication signals, frames, blocks, symbols, sequences, symbol sequences, etc.) over one or more channels (e.g., parallel logic channels, data channels, etc.). Destination nodes 106, 108 may be adapted to receive and/or process signals received from the source nodes 102, 104.

Source nodes 102, 104, destination nodes 106, 108, and relay nodes 110 may be implemented using any appropriate transmitters and receivers adapted to perform the methods described below. One skilled in the art would recognize that system 100 would have other components as well. It is understood that any appropriate combination of these components may be used to implement the invention as described herein.

For example, the method steps of the methods described below may be employed on, by, or at any combination of devices in the system 100.

In some embodiments, source nodes 102, 104, destination nodes 106, 108, and/or relay nodes 110 may be or may include any components or devices which are typically used by, or used in connection with, a computer or computer system. Although not explicitly pictured in FIG. 1, the source nodes 102, 104, destination nodes 106, 108, and/or relay nodes 110 may include one or more central processing units, read only memory (ROM) devices and/or random access memory (RAM) devices. The source nodes 102, 104, destination nodes 106, 108, and/or relay nodes 110 may also include input devices such as a keyboard and/or a mouse or other pointing device, and output devices such as a printer or other device via which data and/or information may be obtained, and/or a display device such as a monitor for displaying information to a user or operator. The source nodes 102, 104, destination nodes 106, 108, and/or relay nodes 110 may also include a transmitter and/or a receiver such as a LAN adapter or communications port for facilitating communication with other system components and/or in a network environment, one or more databases for storing any appropriate data and/or information, one or more programs or sets of instructions for executing methods of the present invention, and/or any other computer components or systems, including any peripheral devices.

According to some embodiments of the present invention, instructions of a program (e.g., controller software) may be read into a memory of the source nodes 102, 104, destination nodes 106, 108, and/or relay nodes 110 from another medium, such as from a ROM device to a RAM device or from a LAN adapter to a RAM device. Execution of sequences of the instructions in the program may cause the source nodes 102, 104, destination nodes 106, 108, and/or relay nodes 110 to perform one or more of the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory may store the software for the controller which may be adapted to execute the software program, and thereby operate in accordance with the present invention, and particularly in accordance with the methods described in detail below. However, it would be understood by one of ordinary skill in the art that the invention as described herein can be implemented in many different ways using a wide range of programming techniques as well as general purpose hardware sub-systems or dedicated controllers.

The program may be stored in a compressed, uncompiled and/or encrypted format. The program furthermore may include program elements that may be generally useful, such as an operating system, a database management system and device drivers for allowing the controller to interface with computer peripheral devices and other equipment/components. Appropriate general purpose program elements are known to those skilled in the art, and need not be described in detail herein.

As indicated herein, the source nodes 102, 104, destination nodes 106, 108, and/or relay nodes 110 may assign rates, modulate signals, and/or encode or decode information. As will be understood by those skilled in the art, the schematic illustrations and accompanying descriptions of the structures and relationships presented herein are merely exemplary arrangements. Any number of other arrangements may be employed besides those suggested by the illustrations provided.

As described herein, independent messages are sent from each source node 102, 104 to the corresponding destination node 106, 108. For simplicity, the embodiments described herein consider a single antenna at each node. Of course, any appropriate number of antennas may be used. At least one embodiment uses HD relay operation. That is, the relay node 110 either receives signals from the source nodes 102, 104 or transmits signals to the destination nodes 106, 108. In the relay-receive (RR) state, also known as the broadcast (BC) mode, each source node 102, 104 broadcasts a signal to both the relay node 110 and its destination node 106, 108. In the relay-transmit (RT) state, also known as the multiple-access (MA) mode, the source nodes 102, 104 and relay nodes 110 cooperatively transmit the signals to the destination nodes 106, 108. The fraction of the time that the IRC is used in RR state is given by t, $0 \leq t \leq 1$. The signal model in the RR state can be written as:

$$y_{1b}^d = h_1^{sd} x_{1b}^s + h_{21}^{sd} x_{2b}^s + z_{1b}^d$$

$$y_b^r = h_1^{sr} x_{1b}^s + h_2^{sr} x_{2b}^s + z_b^r.$$

$$y_{2b}^d = h_2^{sd} x_{2b}^s + h_{12}^{sd} x_{1b}^s + z_{2b}^d$$

In the RT state, the signal model can be written as:

$$y_{1m}^d = h_1^{sd} x_{1m}^s + h_1^{rd} x_m^r + h_{21}^{sd} x_{1m}^s + z_{1m}^d,$$

where received signals are denoted by y, the $$y_{2m}^d = h_2^{sd} x_{2m}^s + h_2^{rd} x_m^r + h_{12}^{sd} x_{1m}^s + z_{2m}^d$$

transmitted signals are denoted by x, the channel matrix between each two terminal is denoted by h, and the noises are denoted by z. Note that the superscripts denote the terminal type. That is, s, r, and d stand for source, destination, and relay nodes, respectively, and the subscripts denotes the source-destination link i=1, 2 and the corresponding HD mode of operation where b stands for the broadcast or RR mode and m stands for multiple access or RT mode.

For example, $x_{1b}^s$ denotes the transmitted signal from the source 102 in RR mode, $h_2^{sd}$ denotes the channel from the source 104 to the destination 108, and $h_{21}^{sd}$ denotes the channel from the source 104 to the destination 106.

The noise vectors are independent circularly symmetric complex Gaussian vectors with zero mean and unit variances. The channel is called interference relay channel (IRC) because without the relay node, the channel reduces to the classical interference channel. Thus, the embodiment described above considers the situation where interference from another source is mitigated through the help of the relay node 110 or, equivalently, the relay node 110 cooperates with both source nodes 102, 104 in transmission of their respective signals.

The channel gains are random and are known only at the corresponding receivers (e.g., destination nodes 106, 108, etc.) and unknown to the transmitters (e.g., source nodes 102, 104, etc.). Block fading channels are considered where the channel gains are constant during the transmission block and change randomly from one block to another following a given probability distribution. The power constraints are considered on the input signals as $E[x_m^r(x_m^r)^*] \leq P_m^r, E[x_{ib}^s (x_{ib}^s)^*] \leq P_{ib}^s$ and $E[x_{im}^s(x_{im}^s)^*] \leq P_{im}^s$ for i=1, 2.

If one of the sources become silent (e.g., $x_{2b}^x = x_{2b}^s = 0$) and the received signal at the corresponding destination node is ignored, the channel reduces to a conventional single relay channel model. One simple communication strategy for IRC is by using TDMA strategy where transmission between each source-destination pair occurs in separate time slot and the relay also cooperates with the corresponding source in the same time slot.

One or more coding strategies may be employed using relay nodes 110 in IRC system 100. For example, amplify and forward or rateless coding may be employed as appropriate.

Figure 2:
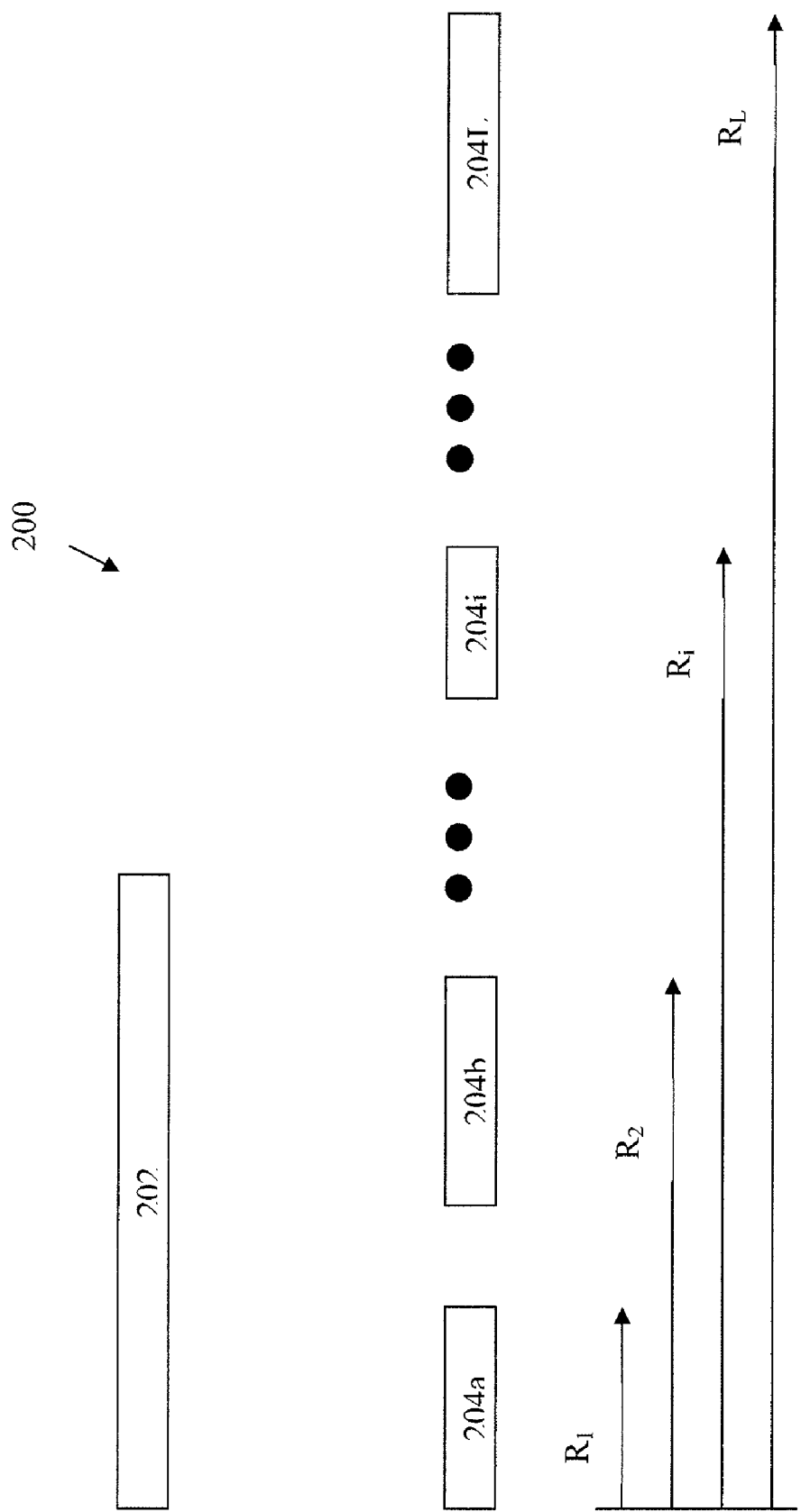
FIG. 2 is a flowchart of a method of amplify and forward coding according to an embodiment of the present invention.

FIG. 2 is a flowchart of a method 200 of amplify and forward coding according to an embodiment of the present invention. The method is performed by the various components of IRC system 100 and begins at step 202. Let $x_{ib}^x = \sqrt{P_{ib}^s} x_i$ and $x_{im}^s = \sqrt{P_{im}^s} x_i$, i=1,2 where $E[x_1 x_1^*]=1$ represent the transmitted signals in two consecutive time slots in RR and RT modes, respectively.

In step 204, both source nodes 102, 104 simultaneously transmit a signal in one time slot in RR mode to the relay node 110. The signals may be messages divided into public and private parts. That is, each message transmitted by source nodes 102, 104 may be first divided into a public part and a private part.

In step 206, both source nodes 102, 104 repeat the same transmitted signal in the next time slot in RT mode. In at least one embodiment, the repeated transmission may include only the public part of the transmitted message. In other embodiments, other portions, parts, or the whole message may be transmitted.

In step 208, the relay node 110 also transmits a helper signal in the same time slot. In RT mode, the relay node 110 simply broadcasts its received signal in RR mode after properly scaling it to satisfy its power constraint.

Accordingly, $x_m^r = \eta y_m^r$ where the scaling factor $\eta$ satisfies $$\eta \leq \sqrt{\frac{P_m^r}{|h_1^{sr}|^2 P_{1b}^s + |h_2^{sr}|^2 P_{2b}^s + 1}}.$$

The received signals for the transmitted symbols $x_1$ and $x_2$ over two time slots in RR and RT mode at the $i^{th}$ destination node (e.g., destination nodes 106, 108, etc.) can be expressed as $$y_i = \begin{bmatrix} y_{ib}^d \\ y_{im}^d \end{bmatrix} = H_i \begin{bmatrix} x_i \\ x_i \end{bmatrix} + z_i \text{ where}$$

$$H_i = \begin{bmatrix} h_i^{sd} \sqrt{P_{ib}^s} & h_i^{sd} \sqrt{P_{ib}^s} \\ h_i^{sd} \sqrt{P_{im}^s} + h_i^{rd} \eta h_i^{sr} \sqrt{P_{ib}^s} & h_{i,i}^{sd} \sqrt{P_{i,m}^s} + h_i^{rd} \eta h_i^{sr} \sqrt{P_{i,b}^s} \end{bmatrix},$$

$$z_i = \begin{bmatrix} z_b^d \\ z_m^d + h_i^{rd} \eta z_b^r \end{bmatrix}, \text{ and } i = \begin{cases} 2, & \text{for } i = 1 \\ 1, & \text{for } i = 2. \end{cases}$$

Let $h_{i,j}$ denote the $i^{th}$ column of the matrix $H_j$. By treating the other user signal as noise, the achievable rate is then given by all the rate tuple $(R_1, R_2)$, where $$R_i = \frac{1}{2} \text{logdet}(I + h_{i,i} h_{i,i}^* N_i^{-1})$$

where $N_i$ is the covariance of the noise plus interference seen by the destination node i. That is, $N_i = E[(h_{i,i} x_i + z_i)(h_{i,i} x_i + z_i)^*]$. Here, the pre log factor ½ accounts for the transmission of the same symbol over two time slots, one RR and one RT modes of the channel.

The method ends at step 210.

Figure 3:
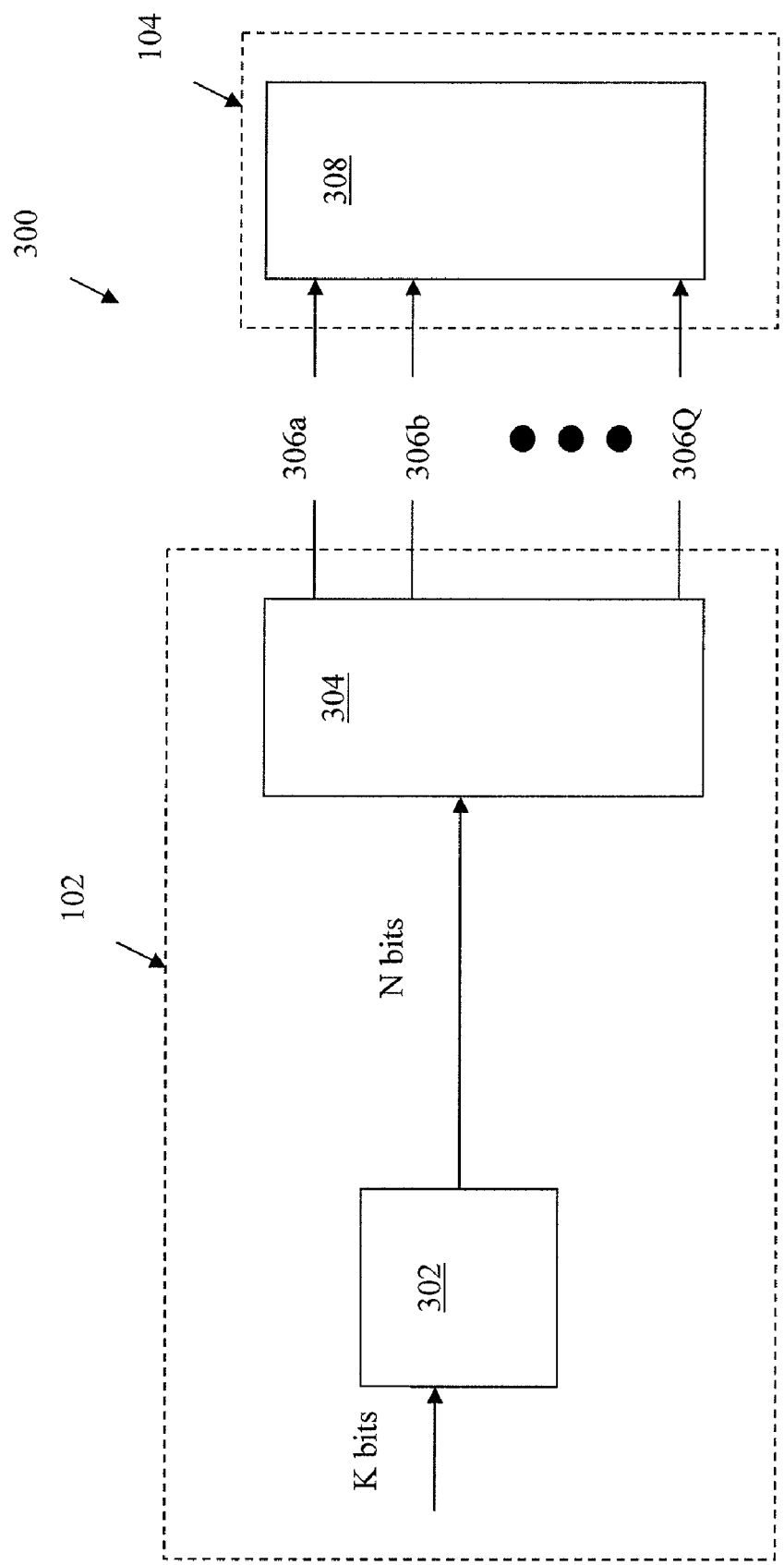
FIG. 3 is a flowchart of a method of rateless coding according to an embodiment of the present invention.

FIG. 3 is a flowchart of a method 300 of rateless coding according to an embodiment of the present invention. The method is performed by the various components of IRC system 100 and begins at step 302. Specifically, variable rated decoding is performed at the relay node 110 only.

Here, the channel is known only to the corresponding destination nodes 106, 108 (e.g., the receivers) and not to the source nodes 102, 104 (e.g., the transmitters). This may be used in the block fading channels where the receivers are able to estimate the channel but the feedback resources are very limited and it is not enough to send the channel state information to the transmitter. The relay node 110 decodes the whole or partial message transmitted from the source nodes 102, 104 in the RR mode in order to generate the cooperative signal that will be transmitted from the relay node 110 in RT mode.

As described in further detail below, a coding strategy is used in which the relay node 110 performs dynamic decoding. For a given number of input messages M, an infinite length code is designed which can be reliably decoded provided that $$\frac{\log M}{n} < I(x_k^n; y^n)$$

for a truncated codeword of length n. In other words, after waiting long enough to receive n symbols such that the mutual information between the $k^{th}$ codeword, $x_k^n$, and the channel output $y^n$ is greater than the effective rate of the code, i.e., $$\frac{\log M}{n},$$

the codeword can be decoded. The rateless codes are very effective in slowly fading environment where the instantaneous CSI is not available at the encoder. Therefore, the code can be effectively decoded at the variable rates depending on the instantaneous capacity of the channel. In the context of the methods 300 and 400 and IRC system 100, there is a feedback channel (not shown) in which the decoders are able to send very limited acknowledgement signals.

In step 304, the source i, i=1, 2 (e.g., source nodes 102, 104, etc.) splits the message $w_i$ into two independent parts (e.g., portions) ($u_i$, $v_i$). In step 306, the first message part $u_i$, i=1, 2, with the rates $R_{u,i}$ are superimposed and sent directly from the source i, i=1, 2 to the corresponding destinations (e.g., destination nodes 106, 108, etc.) while the relay node 110 is in the RT mode.

In step 308, the second message part $v_i$ with rate $R_{v,i}$ is transmitted first to the relay node 110. When the relay node 110 is in RR mode, the second message part is cooperatively transmitted to the destination in the remainder of the time frame in step 310. Of course, as may be understood, method steps 304-308 may be performed substantially at the same time.

The achievable rate for the $i^{th}$ source-destination pair is then $R_i = R_{v,i} + R_{u,i}$. The source node i uses the average power $P_{ib}^s$ and $\alpha_i P_{im}^s$ for the transmission of the partial message $v_i$ in the RR and RT modes, respectively, and the average power $(1-\alpha_i) P_{im}^s$ for the transmission of the partial message $u_i$ in RT mode. The relay node 110 also splits its power to $\theta P_m^r$ and $(1-\theta) P_m^r, 0 \leq \theta \leq 1$ for transmission of the partial messages $v_1$ and $v_2$ in RT mode, respectively.

Using a variable length code for encoding of $v_i$, i=1, 2 and a maximum empirical mutual information (EMI) decoding rule, for a code of length n, the source node i picks a codeword $x_{1s}^n(v_1)$ from the Gaussian codebook $X_{iv}^s$ with an average power $P_{ib}^s$. With successive interference cancellation decoding at the relay node 110, a decoding order 1→2 is chosen in step 312 to decode the partial message $v_1$ by treating $v_2$ as noise in step 314 and then decoding the partial message $v_2$ in step 318 after canceling the effect of v1 on the received signal in step 316. The remainder of the message is decoded in step 320.

For a code frame length of n, the relay node 110 can reliably decode $v_1$ as soon as it receives $n_1$ symbols such that $$nR_{v,1} < n_1 \log\left(1 + \frac{P_{1b}^s |h_1^{sr}|^2}{1 + P_{2b}^s |h_2^{sr}|^2}\right).$$

The relay node 110 waits to receive $n_2 \geq n_1$ symbols such that $nR_{v,2} < n_2 \log(1 + P_{2b}^s |h_n^{sr}|^2)$ to reliably decode $v_2$. As soon as the relay node 110 decodes both partial messages $v_1$ and $v_2$ in steps 318 and 320, it sends acknowledgement (ACKr) to both source nodes 102, 104 and both destination nodes 106, 108 in step 322 which informs the conclusion of the RR mode and beginning of the RT mode. The method ends at step 324, but is described in further detail below.

Note that it is also possible to switch the decoding order to 2→1 and decode $v_2$ first by treating $v_1$ as noise and then decode $v_2$ by using successive interference cancellation (SIC). If the relay node 110 has the knowledge of the transmission rates from the source nodes 102, 104, it can adaptively chooses the best decoding order based on the channel estimates at the beginning of each block in order to minimize the time required to decode both messages.

It should be pointed out that if $n_2 > n_1$ then some time is lost in the reception of the redundant signals for the messages $v_1$ from source node 102. It is noted that since the message $v_1$ is already decoded the subsequent transmitted symbols from source node 102 do not interfere with the signal transmitted by source node 104 and thus does not affect the effective time that relay has to wait in order to decode $v_2$. However, this time may be used by source node 102 in more efficient ways to increase the overall sum throughput.

In the RT state, both the relay and source node i use two Gaussian codebooks $X_{v,1}^r$ and $X_{iu}^s$ of length $n - n_2, n_2 = 1, \ldots, n$ depending on the value of $n_2$. The first codebook is used by both source i and relay nodes to cooperatively resolve the ambiguity of the destination nodes about the message $v_i$. The second codebook is used by the source node i only for the transmission of the partial message $u_i$. The codebook $X_{iu}^s$ is of rate $R_{u,i}$ and has the average power $(1-\alpha_i) P_{im}^s$ and the codebooks $X_{v,1}^r$ and $X_{v,2}^r$ are of rates $R_{v,1}$ and $R_{v,2}$ and have average power $\theta P_m^r$ and $(1-\theta) P_m^r$, respectively. The transmitted signal from the relay node in RT mode is the superposition of the two codewords $x_r^{n-n_2}(v_2)$ and $x_r^{n-n_2}(v_1) + x_r^{n-n_2}(v_2)$ from the codebooks $X_{v,1}^r$ and $X_{v,2}^r$ corresponding to the message $v_1$ and $v_2$, respectively. The $x_r^{n-n_2}(v_1)$ portion of the superposition signal forma a collaborative space-time code with the last codeword $x_{si}^n(v_1)$.

The destination node 106 is aware of the transmission strategy and the switching time from RR to RT mode through ACKr signal, and it waits to receive the entire codeword. Then it starts by first decoding the message $v_1$ based on the information received in both RR and RT states by treating $x_{1s}^{n-n_2}(u_1) \in X_{1u}^s$ and $x_{2s}^n(v_2) \in X_{2v}^s$ as noise. In this way, the destination node 106 effectively sees two parallel Gaussian channels, one for each of RR and RT states, and it can decode the message $v_1$ if:

$$nR_{v,1} < n_2 \log\left(1 + \frac{P^s_{1b}|h^{sd}_1|^2}{1+P^s_{2b}|h^{sd}_{21}|^2}\right) +$$

$$(n-n_2)\log\left(\frac{1+P^s_{1m}|h^{sd}_1|^2 + P^r_m|h^{rd}_1|^2 + P^s_{2m}|h^{sd}_{21}|^2}{1+(1-\alpha_1)P^s_{1m}|h^{sd}_1|^2+(1-\theta)}\right)$$

$$P^r_m|h^{rd}_1|^2 + P^s_{2m}|h^{sd}_{21}|^2$$

where $1+(1-\alpha_1)P_{1m}{}^s|h_1{}^{sd}|^2+(1-\theta)P_m{}^r|h_1{}^{rd}|^2+P_{2m}{}^s|h_{21}{}^{sd}|^2$ is the covariance of the noise plus interference at destination node 106. By doing SIC and removing the effect of $v_1$ on the received signal at the destination in RT mode and treating $x_{2s}{}^n(v_2) \in X^s_{2v}$ as noise, $u_1$ can be decoded if:

$$nR_{u,1} < (n-n_2)\log\left(\frac{1+(1-\alpha_1)P^s_{1m}|h^{sd}_1|^2 + P^s_{2m}|h^{sd}_{21}|^2}{1+P^s_{2m}|h^{sd}_{21}|^2}\right).$$

The decoding condition for the message $v_2$ and $u_2$ at the destination node 108 can be found similarly. Given the value of power splitting factors $\alpha_i$ and and $\theta$ by defining $$t = \frac{n_2}{n},$$

the rate tuple $(R_1,R_2)=(R_{u,1}+R_{v,1}, R_{u,2}+R_{v,2})$ is achievable where the value t is adaptively chosen by using rateless codes and variable rate decoding.

Figure 4:
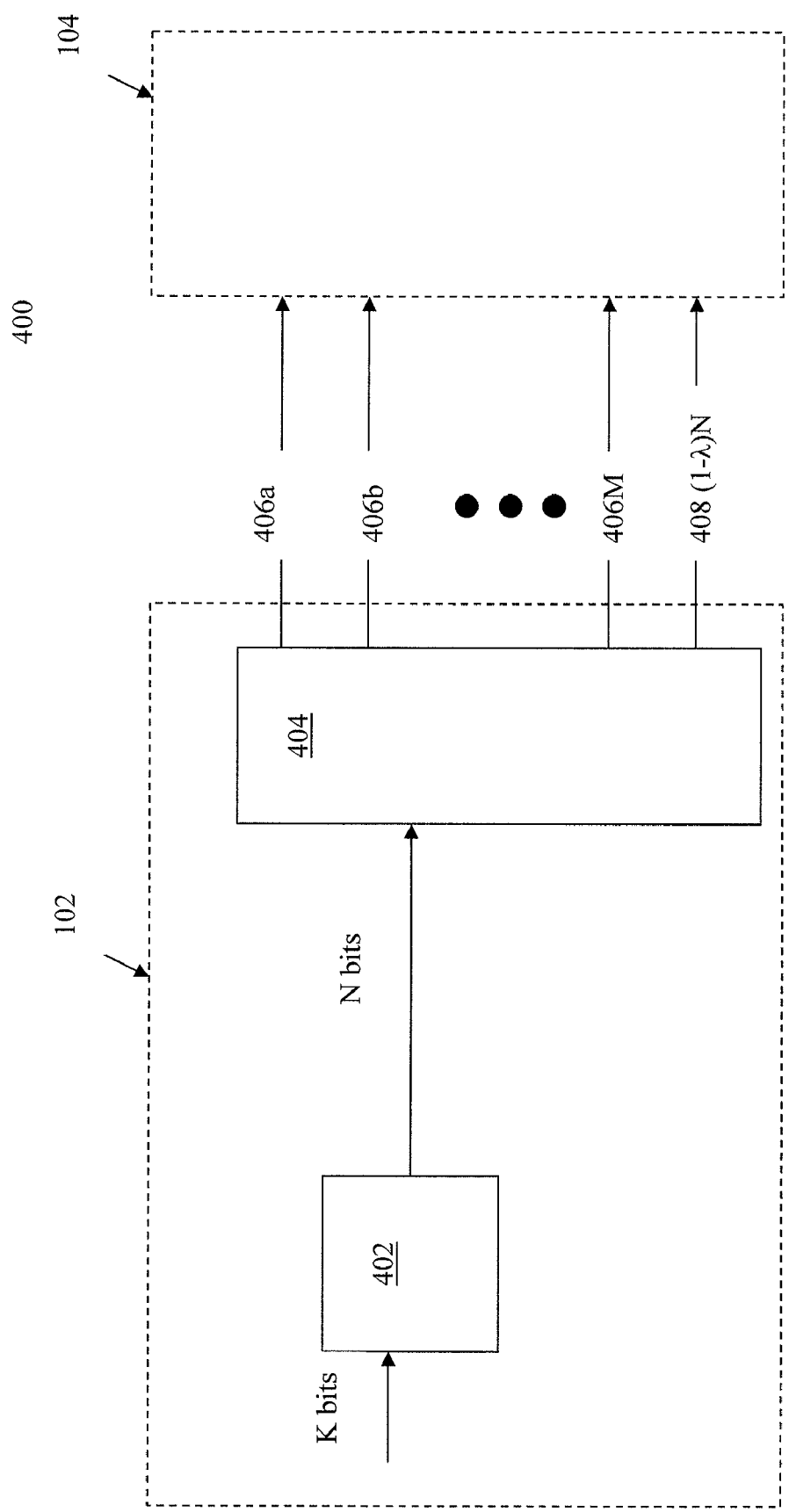
FIG. 4 is a flowchart of a method of rateless coding according to an embodiment of the present invention.

Additionally and/or alternatively, variable rate decoding may be performed at the relay node and the destination nodes. FIG. 4 is a flowchart of a method 400 of rateless coding according to an embodiment of the present invention. The method is performed by the various components of IRC system 100 and begins at step 402. It may be understood that method 400 proceeds from step 310 of method 300 in the alternative. That is, method 400 is another embodiment of decoding and may replace method steps 312-322 in an alternative embodiment.

Where the destination nodes 106, 108 in IRC system 100 also perform variable rate decoding for the message $v_i$ in the RR mode, they may succeed to decode faster than the relay node 110. This happens when the channel gain from either of the source nodes 102, 104 to its destination node 106, 108 is possibly larger than the gain from that source node 102, 104 to the relay node 110. In such case, the destination node, say destination node 108, sends the acknowledgement signal $ACK_{d2}$ to its corresponding source node 104 and the relay node 110 in step 404.

In step 406, the source nodes 102, 104 keep transmitting in the RR mode until the relay node 110 decodes the message $v_1$. In step 408, the relay node 110 sends the $ACK_r$ signal to both source nodes 102 and 104. In this case the source node 104, which has received $ACK_{d2}$ will use its full power in the RT mode for the transmission of $u_2$, and the relay node 110 only cooperates with the other source node 102 in step 410. The method ends at step 412.

In this way, the communication between source node 102 and destination node 106 benefits not only from reduced interference, but also from the stronger cooperative signal from the relay node. The source node 104 also transmits a stronger signal for the message $u_1$ which helps to increase its achievable rate.

In an alternative embodiment, such as in a multiple access channel system, the relay node 110 cooperates with each source-destination pair in turn. Such a strategy is relatively simple compared to the IRC coding strategies discussed above, but is still quite sophisticated in comparison to some baseline schemes such as amplify-and-forward scheme.

The importance of the rateless coding in single user channel is that the capacity of the channel may be achieved without knowing the channel capacity a priori. For example, consider a Gaussian channel with a noise variance 1 for which the channel gain h is unknown. For an available average power P, if a transmission rate is chosen that is higher than $C=\log(1+P|h|^2)$, the transmission is always in error. If a very conservative rate $R<C$ is chosen, then the capacity C cannot be achieved. However, with rateless coding as described above, operation at a rate close to C is possible—provided that the decoder sends an acknowledgement to let the source know the conclusion of the current transmission and start of a new codeword.

Figure 5:
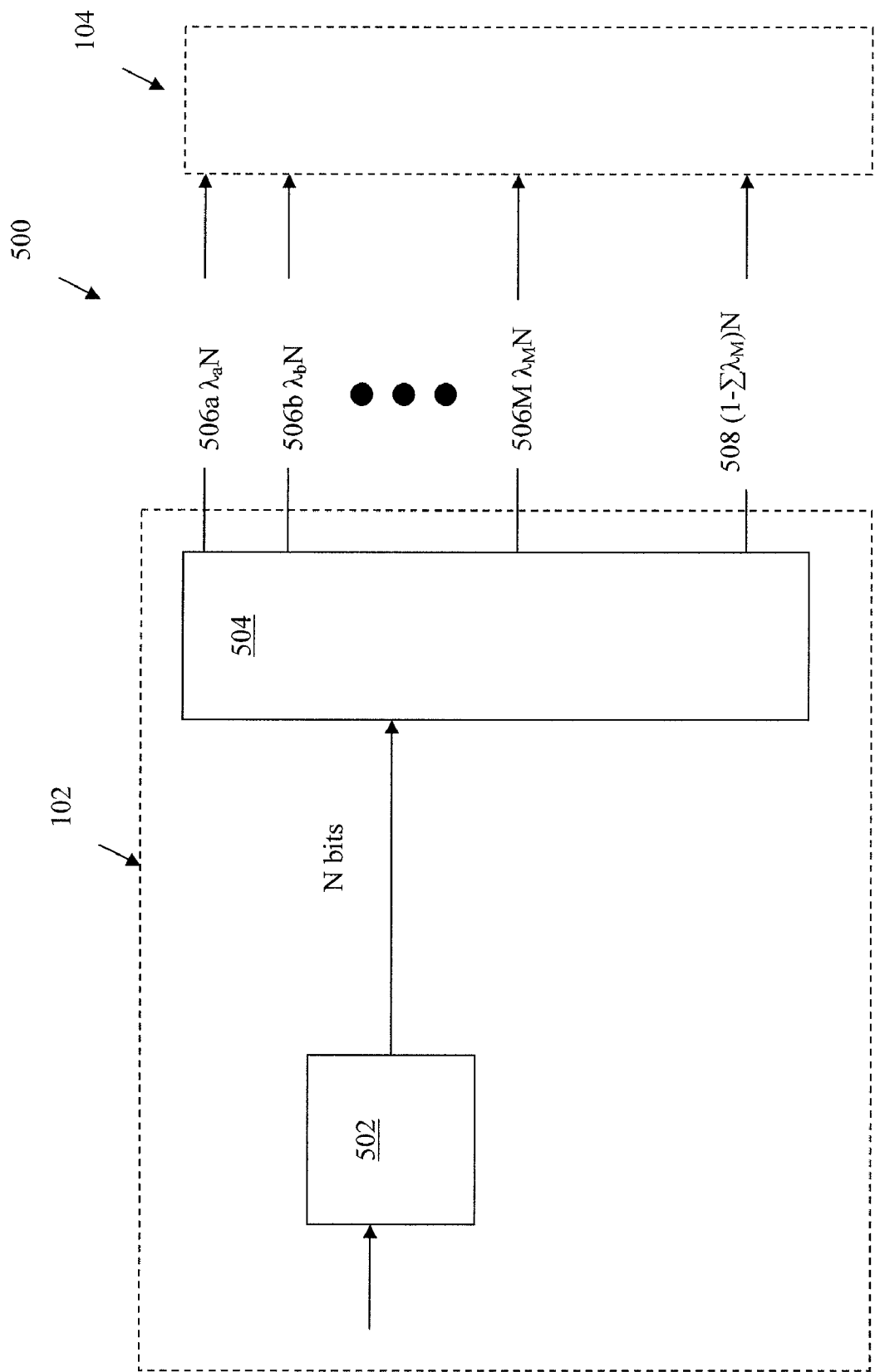
FIG. 5 depicts a multiple access channel system according to an embodiment of the present invention.

FIG. 5 depicts a multiple access channel (MAC) system 500 according to an embodiment of the present invention. The system 500 comprises multiple source nodes 502 and 504—described respectively as $S_1$ and $S_2$. Source nodes 502 and 504 communicate with a single destination node 506—described also as R. Destination node 506 is associated with (e.g., incorporated with, coupled to, etc.) a decoder 508. Decoder 508 and/or destination node 506 have multiple acknowledgement channels 510 and 512. Of course, other numbers of source nodes, acknowledgement channels, and decoders may be used as necessary.

Source nodes 502, 504 may be adapted to transmit signals (e.g., wireless communication signals, frames, blocks, symbols, sequences, symbol sequences, etc.) over one or more channels (e.g., parallel logic channels, data channels, etc.). Destination node 506 and/or decoder 508 may be adapted to receive and/or process signals received from the source nodes 502, 504.

Source nodes 502, 504 and destination node 506 may be implemented using any appropriate transmitters and receivers adapted to perform the methods described below. One skilled in the art would recognize that system 500 would have other components as well. It is understood that any appropriate combination of these components may be used to implement the invention as described herein. For example, the method steps of the methods described below may be employed on, by, or at any combination of devices in the system 500.

In some embodiments, source nodes 502, 504, destination node 506, and/or decoder 508 may be or may include any components or devices which are typically used by, or used in connection with, a computer or computer system. Although not explicitly pictured in FIG. 5, the source nodes 502, 504, destination node 506, and/or decoder 508 may include one or more central processing units, read only memory (ROM) devices and/or random access memory (RAM) devices. The source nodes 502, 504, destination node 506, and/or decoder 508 may also include input devices such as a keyboard and/or a mouse or other pointing device, and output devices such as a printer or other device via which data and/or information may be obtained, and/or a display device such as a monitor for displaying information to a user or operator. The source nodes 502, 504, destination node 506, and/or decoder 508 may also include a transmitter and/or a receiver such as a LAN adapter or communications port for facilitating communication with other system components and/or in a network environment, one or more databases for storing any appropriate data and/or information, one or more programs or sets of instructions for executing methods of the present invention, and/or any other computer components or systems, including any peripheral devices.

According to some embodiments of the present invention, instructions of a program (e.g., controller software) may be read into a memory of the source nodes 502, 504, destination node 506, and/or decoder 508 from another medium, such as from a ROM device to a RAM device or from a LAN adapter to a RAM device. Execution of sequences of the instructions in the program may cause the source nodes 502, 504, destination node 506, and/or decoder 508 to perform one or more of the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory may store the software for the controller which may be adapted to execute the software program, and thereby operate in accordance with the present invention, and particularly in accordance with the methods described in detail below. However, it would be understood by one of ordinary skill in the art that the invention as described herein can be implemented in many different ways using a wide range of programming techniques as well as general purpose hardware sub-systems or dedicated controllers.

The program may be stored in a compressed, uncompiled and/or encrypted format. The program furthermore may include program elements that may be generally useful, such as an operating system, a database management system and device drivers for allowing the controller to interface with computer peripheral devices and other equipment/components. Appropriate general purpose program elements are known to those skilled in the art, and need not be described in detail herein.

As indicated herein, the source nodes 502, 504, destination node 506, and/or decoder 508 may assign rates, modulate signals, and/or encode or decode information. As will be understood by those skilled in the art, the schematic illustrations and accompanying descriptions of the structures and relationships presented herein are merely exemplary arrangements. Any number of other arrangements may be employed besides those suggested by the illustrations provided.

In one embodiment of the arrangement of FIG. 5, acknowledgement channels 510 and 512 are low rate channels. The signal model can be written as $y = h_1 x_1 + h_2 x_2 + z$ where the received signals is denoted by y, the transmitted signals from the source $S_i$ is denoted by $x_i$, the channel matrix between source $S_i$ and destination is denoted by $h_i$, and z is circularly symmetric Gaussian noise. The average power constraints is given by $E[x_i x_i^*] \leq P_i$ for $i=1, 2$.

FIG. 5 depicts communication over the Gaussian multiple access channel with acknowledgement where the channel gains and other user powers are unknown to each user. A multiple access coding strategy that is distributed and can achieve any rate on the boundary of the capacity region for this channel as if all channel gains and other user power was known to all users is discussed in detail below. This strategy does not require joint decoding and it only uses single user decoding in conjunction with successive interference cancellation.

Figure 6:
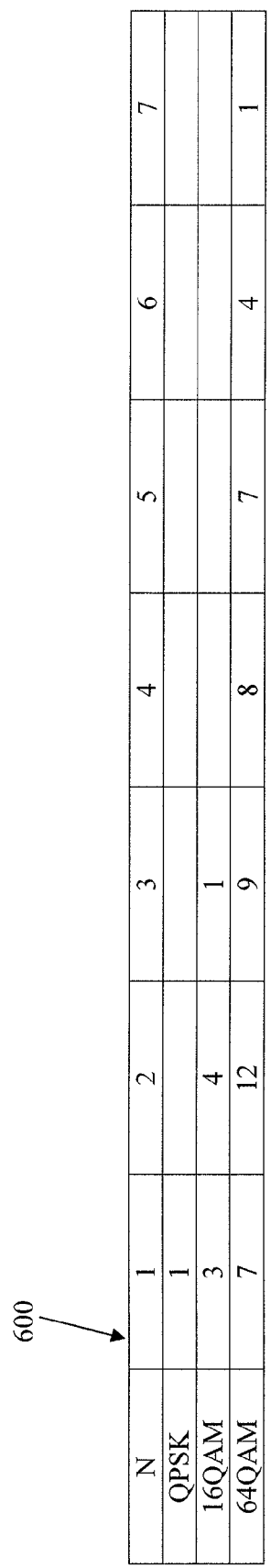
FIG. 6 depicts node states for QPSK, 16QAM and 64QAM selections.

FIG. 6 depicts node states for QPSK, 16QAM and 64QAM selections.

Assume each user i has a queue of information bits to send which is connected to two feeders $F^i_1$ and $F^i_2$. Each user i selects a packet from its queue, puts it in its first feeder $F^i_1$, and begins transmission by using a rateless code with Gaussian codebook. Let log(M) represent the information content of each packet, where M is the number of messages to be sent. The destination node assumes a decoding order, say $1 \rightarrow 2$, hence, it will be able to decode the message $m^{(1)}_1$ from source node 502 if it gathers enough mutual information after reception of $n_1$ symbols such that $$\log(M) < n_1 \log\left(1 + \frac{P_1|h_1|^2}{1 + P_2|h_2|^2}\right).$$

The destination node 506 receives the transmission and decodes the message and can then inform the source node 502 to send the next packet (e.g., $m_2^{(1)}$). Having decoded the messages from the source node 502, the destination node can successively cancel them and decode the message transmitted from the other source $m_2^{(1)}$ if it waits for $n_2$ symbols such that $\log(M) < n_2 \log(1 + P_2|h_2|^2)$.

Note that $n_2$ might be smaller than $n_1$ which means that the destination node 506 can inform the source node 504 to send the next packet (e.g., $m_2^{(2)}$), even though it has not yet decoded the previous packet from the first user (e.g., $m_1^{(2)}$) and has to wait till it gets $n_1$ symbol and decode $m_1^{(1)}$ first. If the decoding order $2 \rightarrow 1$ is used, then the decoding conditions are given by $$\log(M) < k_1 \log(1 + P_1|h_1|^2), \log(M) < k_2 \log\left(1 + \frac{P_2|h_2|^2}{1 + P_1|h_1|^2}\right)$$

where $k_1$ and $k_2$ are the number of symbols to be received by the destination node for decoding of the messages from the source node 502 and 504, respectively. If the destination node keeps the decoding order $1 \rightarrow 2$ for a long enough time, then the effective rate for the source node i is $$R_i = \frac{\log(m)}{n_i} \text{ and } \gamma_1 = \frac{R_2}{R_1} = \frac{n_1}{n_2}.$$

Similarly, for decoding order $$2 \rightarrow 1, \gamma_2 = \frac{R_2}{R_1} = \frac{k_1}{k_2}.$$

In fact, for each decoding order, one corner point of the capacity region on the maximum sum rate is achieved.

To achieve any point in the boundary of the capacity region with maximum sum rate, assume any desired rate proportion $$\gamma = \frac{R_2}{R_1}$$

such that $\gamma_1 \leq \gamma \leq \gamma_2$. A determination is made as to whether an acknowledgement goes to only source node i or to all source nodes. If the acknowledgement is sent only to source node i, $ACK_{di}, i=1,2$ is sent in step 614. In response to sending $ACK_{di}$, source node i clears its current feeder and the method passes control back to step 604. If the acknowledgement is sent to all source nodes, $ACK_{fi}, i=1,2$ is sent simultaneously to all source nodes. In response to sending $ACK_{fj}$, each source node suspends the transmission from the current feeder if it is not the feeder j and resumes the transmission from where it was left off in feeder j. The method passes control back.

The procedure starts by assuming an arbitrary decoding order, say 1→2. Each step is defined as when some acknowledgement signal is sent. At the first step, after receiving min $(n_1 n_2)$ symbols and before sending the first acknowledgement signal, the effective rate proportion $\gamma(1)$ is determined. If $\gamma(1) < \gamma$, $ACK_{f2}$ is sent along with the appropriate $ACK_{di}$ signal depending on whether $n_1 < n_2$ or $n_2 < n_1$. Otherwise, if $\gamma(1) > \gamma$, then the $ACK_{di}$ signal is sent depending on whether $n_1 < n_2$ or $n_2 < n_1$. The transmission continues and at the $K^{th}$ step, as soon as one of the conditions described above with respect to FIG. 6 is satisfied, the effective time proportion $\gamma(K)$ is calculated. Based on whether $\gamma(K) > \gamma$ or $\gamma(K) < \gamma$, $ACK_{f1}$ or $ACK_{f2}$ is sent, respectively. Also, $ACK_{di}$ is sent depending on which one of the above conditions is satisfied.

In an alternative embodiment, an alternative coding strategy is used for the IRC. By using the rateless coding discussed above for MAC in the RR mode, the overall sum throughput of the system is improved.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of transmission in an interference relay channel wireless transmission system comprising:
   dividing each of a plurality of messages into a public part and a private part;
   transmitting the public part of a first message of the plurality of messages and the private part of the first message from a first source wireless transmitter in a relay-receive mode in a first wireless time slot;
   transmitting the public part of a second message of the plurality of messages and the private part of the second message from a second source wireless transmitter in a relay-receive (RR) mode in the first wireless time slot;
   transmitting a repeat of the public part of the first message from the first source wireless transmitter and a repeat of the public part of the second message from the second source wireless transmitter in a relay-transmit (RT) mode in a second time slot; and
   transmitting a helper signal for each of the first and second messages from a wireless relay transmitter in the second time slot, wherein the wireless relay transmitter splits its power for transmission of the first and second messages, respectively;
   using the helper signal to cooperate with all active source wireless transmitters and mitigate wireless interference at active destination nodes based on the signal that the wireless relay transmitter previously received from transmitting sources; and
   in the RT mode, broadcasting received signals in the RR mode after scaling the received signals to satisfy a power constraint.

2. The method of claim 1 further comprising:
   receiving the parts of the first and second messages at the wireless relay transmitter; and
   transmitting the helper signal based at least in part on the received parts of the first and second messages.

3. The method of claim 2 further comprising:
   amplifying the helper signal at the wireless relay transmitter.

4. A method of message decoding in an interference relay channel wireless transmission system comprising:
   determining a decoding order for a plurality of message parts received by the wireless transmission system;
   determining a first message part of the plurality of message parts as noise;
   canceling the first message part based on the determination of the message part as noise;
   decoding a second part of the plurality of message parts; and
   decoding a remainder of the message parts;
   splitting a wireless relay transmitter power for transmission of the messages;
   using a helper signal to cooperate with all active source wireless transmitters and mitigate wireless interference at active destination nodes based on the signal that the wireless relay transmitter previously received from transmitting sources; and
   broadcasting received signals in a relay-receive mode after scaling the received signals to satisfy a power constraint.

5. The method of claim 4 further comprising:
   sending a wireless message acknowledgement to a wireless message transmitter after decoding the remainder of the message parts.

6. The method of claim 5 wherein sending the message acknowledgement further comprises wirelessly sending the message acknowledgement to a wireless relay transmitter.

7. A computer readable medium having program instructions stored thereon, the instructions capable of execution by a processor and defining the steps of:
   dividing each of a plurality of messages into a public part and a private part;
   transmitting the public part of a first message of the plurality of messages and the private part of the first message from a first source wireless transmitter in a relay-receive mode in a first wireless time slot;
   transmitting the public part of a second message of the plurality of messages and the private part of the second message from a second source wireless transmitter in a relay-receive mode in the first wireless time slot;
   transmitting a repeat of the public part of the first message from the first source wireless transmitter and a repeat of the public part of the second message from the second source wireless transmitter in a relay-transmit mode in a second wireless time slot; and
   transmitting a helper signal for each of the first and second messages from a wireless relay transmitter in the second time slot, wherein the wireless relay transmitter splits its power for transmission of the first and second messages, respectively;
   using the helper signal to cooperate with all active source wireless transmitters and mitigate wireless interference at active destination nodes based on the signal that the wireless relay transmitter previously received from transmitting sources; and
   in the RT mode, broadcasting received signals in the RR mode after scaling the received signals to satisfy a power constraint.

8. The computer readable medium of claim 7 wherein the instructions further define the step of:

receiving the parts of the first and second messages at the wireless relay transmitter; and transmitting the helper signal based at least in part on the received parts of the first and second messages.

9. The computer readable medium of claim 8 wherein the instructions further define the step of:

amplifying the helper signal at the wireless relay transmitter.

10. A computer readable medium having program instructions stored thereon, the instructions capable of execution by a processor and defining the steps of:

determining a decoding order for a plurality of message parts;

determining a first message part of the plurality of message parts as noise;

canceling the first message part based on the determination of the message part as noise;

decoding a second part of the plurality of message parts; and decoding a remainder of the message parts;

splitting a wireless relay transmitter power for transmission of the messages;

using a helper signal to cooperate with all active source wireless transmitters and mitigate wireless interference at active destination nodes based on the signal that the wireless relay transmitter previously received from transmitting sources; and broadcasting received signals in a relay-receive mode after scaling the received signals to satisfy a power constraint.

11. The computer readable medium of claim 10 wherein the instructions further define the step of:

sending a message acknowledgement to a message transmitter after decoding the remainder of the message parts.

12. The computer readable medium of claim 11 wherein the instructions for sending the message acknowledgement further comprise the step of sending the message acknowledgement to a relay transmitter.

13. An interference relay channel wireless transmission system comprising:

means for dividing each of a plurality of messages into a public part and a private part;

means for transmitting the public part of a first message of the plurality of messages and the private part of the first message from a first source wireless transmitter in a relay-receive mode in a first wireless time slot;

means for transmitting the public part of a second message of the plurality of messages and the private part of the second message from a second source wireless transmitter in a relay-receive mode in the first wireless time slot;

means for transmitting a repeat of the public part of the first message from the first wireless source transmitter and a repeat of the public part of the second message from the second source wireless transmitter in a relay-transmit mode in a second wireless time slot; and means for transmitting a helper signal for each of the first and second messages from a wireless relay transmitter in the second time slot, wherein the wireless relay transmitter splits its power for transmission of the first and second messages, respectivel;

means for using the helper signal to cooperate with all active source wireless transmitters and mitigate wireless interference at active destination nodes based on the signal that the wireless relay transmitter previously received from transmitting sources; and in the RT mode, means for broadcasting received signals in the RR mode after scaling the received signals to satisfy a power constraint.

14. The system of claim 13 further comprising:

means for receiving the parts of the first and second messages at the wireless relay transmitter; and means for transmitting the helper signal based at least in part on the received parts of the first and second messages.

15. The system of claim 14 further comprising:

means for amplifying the helper signal at the relay transmitter.

16. An interference relay channel wireless transmission system comprising:

means for determining a decoding order for a plurality of message parts received by the wireless transmission system;

means for determining a first message part of the plurality of message parts as noise;

means for canceling the first message part based on the determination of the message part as noise;

means for decoding a second part of the plurality of message parts; and means for decoding a remainder of the message parts with a helper signal, wherein the helper signal cooperates with all active source wireless transmitters and mitigates wireless interference at active destination nodes based on the signal that the wireless relay transmitter previously received from transmitting sources and wherein in the RT mode, the wireless relay transmitter broadcasts received signals in the RR mode after scaling the received signals to satisfy a power constraint.

17. The system of claim 16 further comprising:

means for sending a message acknowledgement to a wireless message transmitter after decoding the remainder of the message parts.

18. The system of claim 17, wherein the power constraints on the input signals is $E[x_m^r(x_m^r)^*] \leq P_m^r, E[x_{ib}^s(x_{ib}^s)^*] \leq P_{ib}^s$ and $E[x_{im}^s(x_{im}^x)^*] \leq P_{im}^s$ for $i=1,2$.

19. The system of claim 17, comprising a variable length code means for encoding a partial message $v_i$, $i=1, 2$ with a maximum empirical mutual information (EMI) decoding rule, wherein for a code of length n, a source node i picks a codeword $x_{1_s}^n(v_1)$ from a Gaussian codebook $X_{iv}^s$ with an average power $P_{ib}^s$.

20. The system of claim 19, comprising a successive interference cancellation decoding means where a decoding order 1→2 is chosen to decode the partial message $v_1$ by treating $v_2$ as noise and then decoding the partial message $v_2$ after canceling the effect of v1 on a received signal.

21. The system of claim 19, wherein for a code frame length of n, a relay node reliably decodes $v_1$ as soon as the relay node receives $n_1$ symbols and where:

$$nR_{v,1} < n_1 \log\left(1 + \frac{P_{1b}^s|h_1^{sr}|^2}{1 + P_{2b}^s|h_2^{sr}|2}\right).$$

22. The system of claim 19, wherein the relay node waits to receive $n_2 \geq n_1$ symbols where $nR_{v,2} < n_2 \log(1+P_{2b}^s|h_n^{sr}|^2)$ to reliably decode $v_2$.

23. The system of claim 22, wherein the means for decoding comprises means for decoding partial messages $v_1$ and $v_2$ and sending an acknowledgement (ACKr) to source nodes and destination nodes to indicate an end of an RR mode and a beginning of an RT mode.

* * * * *